INVENTOR.
GEORGE T. HEMMETER
BY
ATTORNEY

Feb. 21, 1950 G. T. HEMMETER 2,498,420
COMBINATION CLOTHES WASHER AND EXTRACTOR
Filed July 17, 1944 8 Sheets-Sheet 2

INVENTOR.
GEORGE T. HEMMETER
BY
ATTORNEY

Feb. 21, 1950  G. T. HEMMETER  2,498,420
COMBINATION CLOTHES WASHER AND EXTRACTOR
Filed July 17, 1944  8 Sheets-Sheet 5

INVENTOR.
GEORGE T. HEMMETER
BY
ATTORNEY

Feb. 21, 1950     G. T. HEMMETER     2,498,420
COMBINATION CLOTHES WASHER AND EXTRACTOR

Filed July 17, 1944     8 Sheets-Sheet 6

INVENTOR.
GEORGE T. HEMMETER
BY
ATTORNEY

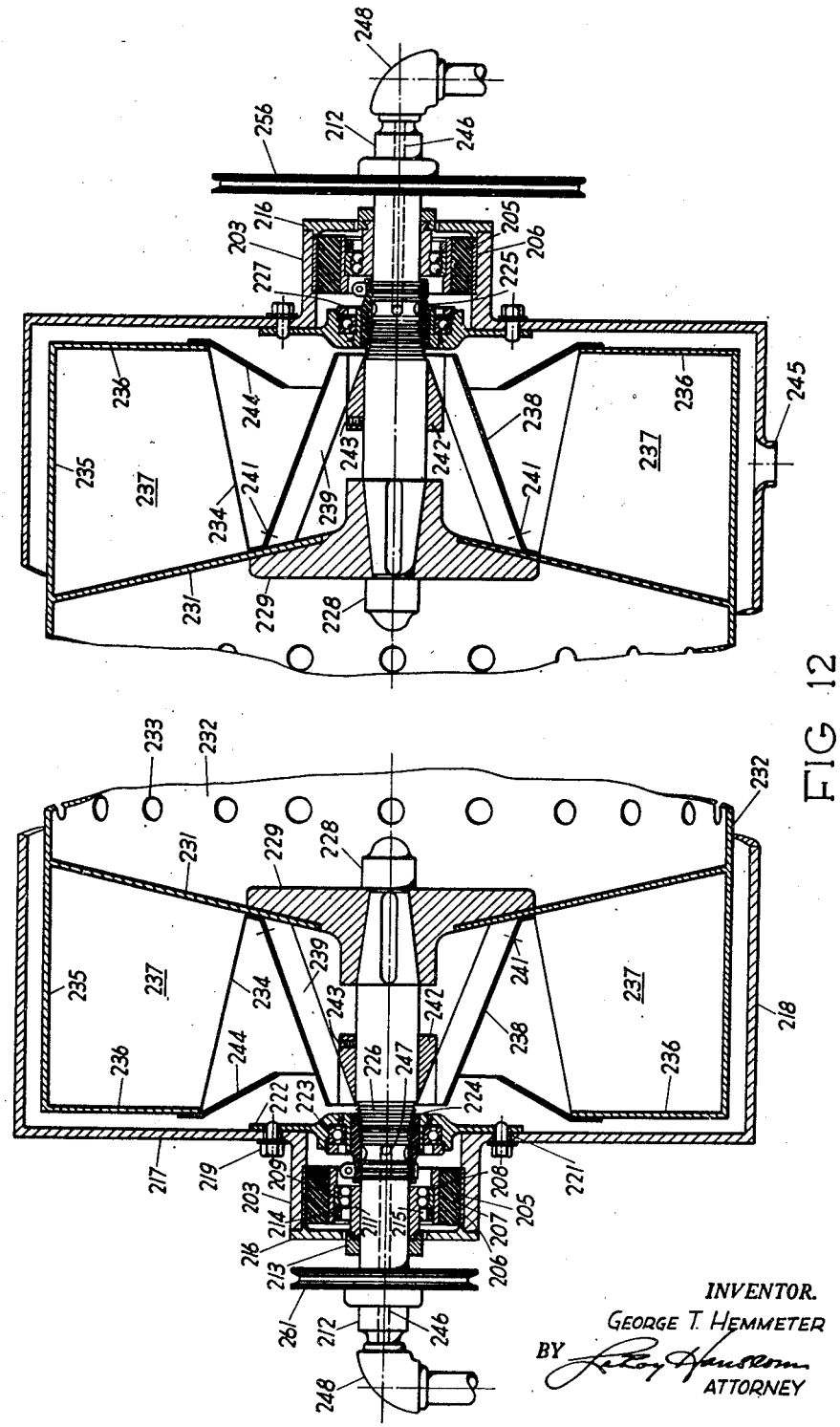

Feb. 21, 1950  G. T. HEMMETER  2,498,420
COMBINATION CLOTHES WASHER AND EXTRACTOR
Filed July 17, 1944  8 Sheets-Sheet 8

INVENTOR.
GEORGE T. HEMMETER
BY
ATTORNEY

UNITED STATES PATENT OFFICE 2,498,420

COMBINATION CLOTHES WASHER AND EXTRACTOR

George T. Hemmeter, Berkeley, Calif.

Application July 17, 1944, Serial No. 545,328

26 Claims. (Cl. 68—24)

This invention relates in general to dynamically balanced rotors and more particularly to dynamically balanced clothes extractors and combination washers and extractors.

Rotors of all descriptions when not in dynamic balance are subject to vibration, and when operated at relatively high speeds the centrifugal force developed greatly accentuates the existing out-of-balance condition. The resulting vibration is objectionable not only because of the accompanying noise but is injurious to the equipment and to the base on which it is mounted.

To effectively clean clothes they should be agitated continuously in the cleaning fluid and consequently when this operation is carried out in a combination washer and extractor, the basket of the machine during its washing cycle should be rotated only at such speeds that centrifugal force is ineffective to maintain the clothes against the surface of the basket so that on reaching their zenith of travel they can fall back freely into the cleaning fluid. During the extracting cycle however, the basket should be rotated at as high a speed as is possible consistent with safety and economy of manufacture. Unfortunately the higher the speed at which a basket is rotated, the greater is the dynamic unbalancing force to which the basket is subjected. To compensate for this lack of balancing means, the basket during the washing cycle is rotated at such a speed that the clothes are always retained on the surface of the basket, this being done on the theory that the clothes as initially picked up by the basket, are more uniformly distributed over its surface than would be the case if allowed to tumble within the basket during the washing cycle and then picked up by the basket during the initial stage of the extracting. The dynamic unbalance of the basket and its load is further minimized by limiting its speed of rotation during the extracting cycle. It will therefore be seen that a compromise is made during the extracting cycle as well as during the washing cycle. During the latter cycle the basket is rotated at a speed too high for effecting washing, and during the extracting cycle at a speed too low to effectively dry the clothes.

The provision then of means for dynamically balancing a basket and its load and for maintaining it and its load in dynamic balance during the extracting cycle, is further advantageous in that such means makes it possible to use a single basket effectively as an extractor as well as a washer.

The attainment of a dynamically balanced rotor, basket or spinner is particularly difficult for the reason that the clothes being handled present relatively large masses which cannot be readily and uniformly distributed over the surface of the basket. Furthermore, as water is spun from the clothes during the drying or extracting cycle, the out-of-balance condition continuously changes.

In general, the object of this invention is the provision in conjunction with the basket or spinner of a clothes washer and/or extractor of means for quickly bringing such basket into dynamic balance, and for then maintaining it in a dynamically balanced condition irrespective of the fact that the effective load carried by it changes continuously.

Another object of the invention is the provision in conjunction with equipment of the general character referred to, of a simple but positive valve operating in response to any out-of-balance of the basket immediately to permit the introduction of a balancing fluid to the "light" side of the rotor.

A further object of the invention is the provision of a valve of the character above referred to, which readily can be adjusted to increase or decrease its sensitiveness and which readily can be removed and replaced within a relatively short time.

Still another object of the invention is the provision in conjunction with rotary equipment of the general character referred to of a fluid operated clutch for transmitting power to the basket only when the balancing or distributing valve is in communication with a source of balancing fluid.

A still further object of my invention is the provision in conjunction with a combination washer and extractor, of a power transmission system for driving the equipment at a relatively low speed during the washing cycle and then at a relatively high speed during the extracting cycle, but only during such time as the dynamic balancing distributing valve is effective.

Another object of the invention is the provision of a multiple speed transmission device and an inertia responsive valve for driving the basket at a relatively low speed during the washing operation and for then bringing the basket into dynamic balance during the extracting cycle only at a speed at which vibrations above a predetermined amplitude do not occur.

A further object of the invention is the provision in a horizontal shaft type washer and extractor, of a distributing valve responsive to any radial movement of the washer shaft away from its normal axis and which substantially is unaffected by the weight of the washer and its load.

Still another object of the invention is the provision in a combination washer and extractor, of means for permitting a balancing valve formed about the basket shaft, to seek its own unstressed position about the shaft and for then locking the valve in that position by a fluid operated lock.

The invention possesses other advantageous features, some of which with the foregoing will be set forth at length in the following description where that form of the invention which has been selected for illustration in the drawings accompanying and forming a part of the present specification is outlined in full. In said drawings, several forms of the invention have been illustrated, but it is to be understood that it is not limited to such forms.

Referring to the drawings:

Figure 12 is a vertical mid-section of the combination washer and extractor diagrammatically illustrated in Figure 10, but with its outer shell or casing omitted.

Figure 1:
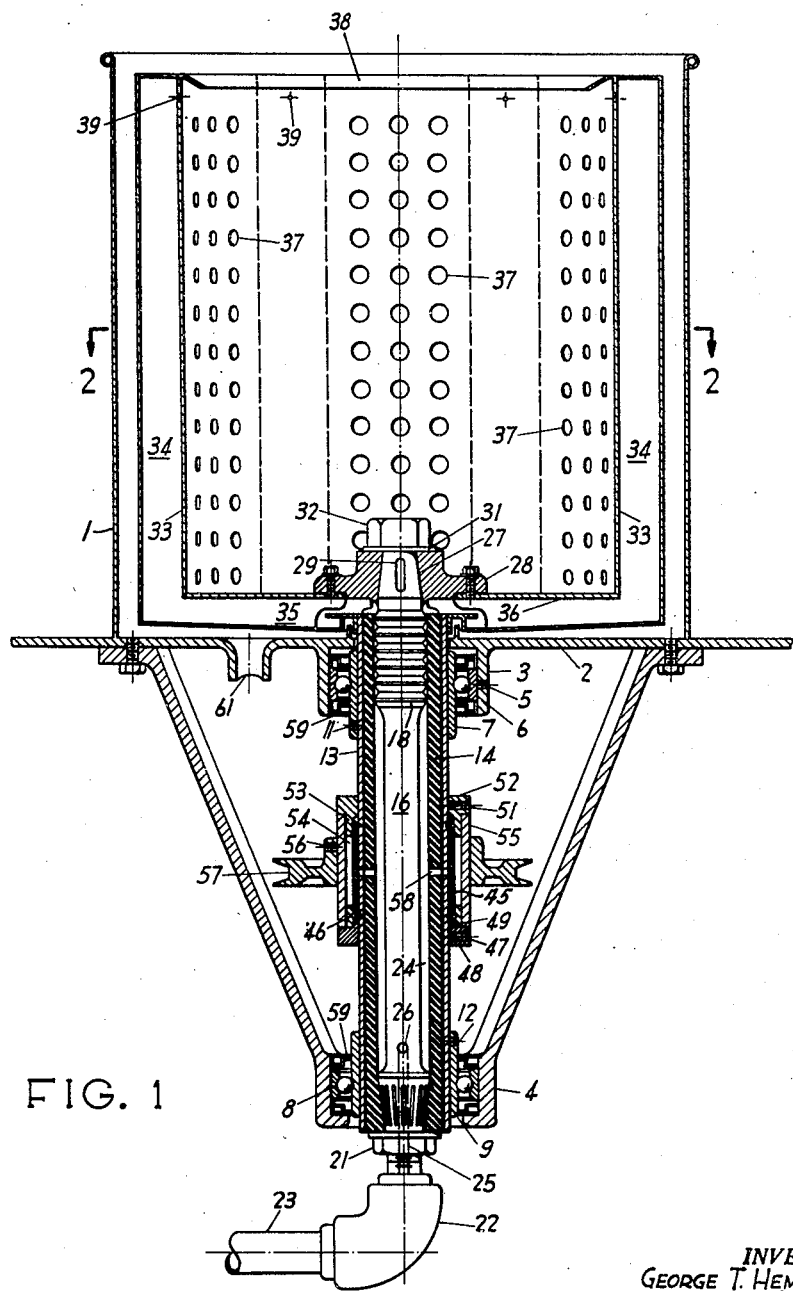
Figure 1 is a vertical mid-section of a vertical type clothes washer and extractor embodying some of the objects of my invention.
Figure 2:
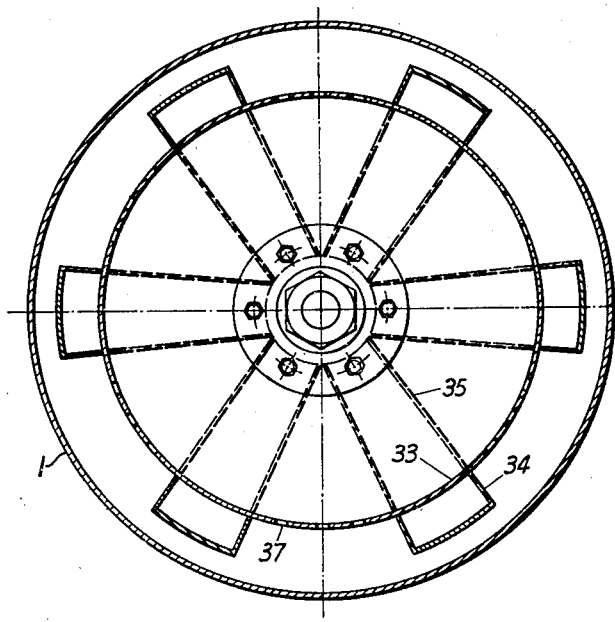
Figure 2 is a horizontal section taken on the line 2—2 of Figure 1.
Figure 3:
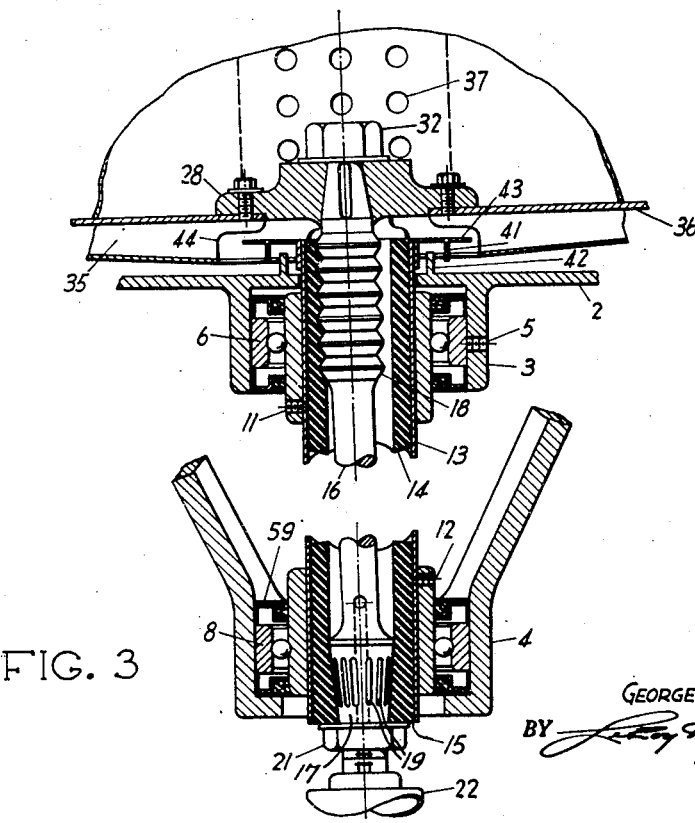
Figure 3 is an enlarged vertical section of the valve illustrated in Figure 1, with the valve in its open or distributing position and with the fluid clutch omitted.

The extractor illustrated in Figures 1, 2 and 3 is intended primarily for household purposes and in general consists of an outer casing or shell to the lower side of which are secured a pair of vertically aligned deep grooved thrust bearings. Supported by these bearings is a composite shaft and fluid distributing valve to which power can be transmitted through a fluid operated clutch. Secured to the upper end of one of the members of the composite shaft and distributing valve is the washer rotor and formed on the external walls of the rotor are a plurality of peripherally spaced fluid pockets arranged selectively to be placed in communication with a source of fluid under pressure under control of the distributing valve. The distributing valve is in turn arranged to operate in response to any existing dynamic out-of-balance of the rotor.

More specifically this extractor (which in larger sizes can be used as a combined washer and extractor) comprises an outer cylindrical shell or casing 1 provided with a bottom 2 from which the entire structure can be supported in any desired manner. Carried by the base 2 are vertically spaced bearing supports 3 and 4 coaxially disposed with respect to the casing 1. Secured within the bearing supports by a set screw 5 is a ball thrust bearing 6 provided with a bearing sleeve 7 and accommodated within the bearing support 4 is a ball thrust bearing 8 provided with a bearing sleeve 9.

Removably secured to the bearing sleeves 7 and 9 by set screws 11 and 12 is a metal sleeve 13 to the inner surface of which is vulcanized a resilient straight walled rubber or elastomer liner 14 formed with a downwardly converging or tapered lower end 15. Disposed within the liner 14 is a shaft 16, formed at its lower end with an enlarged mating tapered plug 17 and at its upper end with a series of corrugated or enlarged peripheral ridges or circular zones 18 normally having a force fit with the liner 14 and which define intermediate circular channels. The plug 17 is formed with a serrated surface 19 and arranged to be tightly seated within the downwardly converging end 15 of the liner 14 for the purpose of effectively sealing off the lower end of the sleeve 13 and its liner and for the additional purpose of transmitting driving torque from the sleeve and liner to the shaft 16 as hereinafter more fully explained. As shown in Figure 1, the upper ridged end of the shaft effectively seals off the upper end of the liner 14 except when for any reason it is laterally displaced, as shown somewhat exaggerated in Figure 3.

Threaded to the shaft 16 below the plug 17 is a nut 21 having a thrust engagement with the lower end of the liner 14 and by which the plug 17 can be drawn into as tight engagement with the liner as is desired. Secured to the lower free end of the shaft 16 is a swivel joint 22, and which in turn communicates with a suitable source of water under pressure through a conduit 23. Communication between the swivel joint 22 and the annular space 24 defined by the shaft 16 and the liner 14 is effected through an axial bore 25 and a transverse bore 26 drilled in the shaft 16.

Seated over the upper tapered end 27 of the shaft 16 is a hub 28 of a depth slightly greater than the length of the taper on the shaft, and provided with a key way adapted to receive a key 29 formed on the taper. Threaded to the upper free end of the shaft 16 over a washer 31 is a nut 32 by which the hub can be rigidly fastened to the shaft.

Bolted to the hub 28 within the shell is a cylindrical basket or rotor 33 provided on its outer surface with a plurality of peripheral spaced, longitudinally extending balancing receptacles or pockets 34. The lower ends of the pockets 34 communicate through radial conduits 35 provided on the bottom 36 of the basket, with a zone immediately beneath the hub 28 and surrounding the upper end of the sleeve 13. Formed in the side walls of the basket intermediate the pockets 34 are perforations 37 for the passage of water from the interior to the exterior of the basket.

Preferably the upper end of the basket is provided with a splash guard 38 and with small holes 39 establishing communication between the upper ends of the pockets 34 and the interior of the basket.

Secured to the upper end of the sleeve 13 is a circular channel 41 surrounding a ring 42 provided on the upper face of the bearing support 3 and formed with a flange 43 extending radially beneath the undercut portions 44 of the inner lateral walls of the conduits 35.

Fitted over the sleeve 13 intermediate its ends is a cylindrical rubber diaphragm 45, sealed at either end to the sleeve by wire clamps 46. Fastened to the sleeve 13 below the diaphragm 45 and by a set screw 47 is a collar 48 formed with a short upwardly extending bearing flange 49. Fastened to the sleeve 13 immediately above the diaphragm 45 by a set screw 51, is a collar 52 formed integrally with a downwardly extending bronze clutch sleeve 53. The sleeve is formed with a plurality of peripherally spaced, longitudinally extending slots 54 for the purpose of making the clutch sleeve 53 resilient and distendable throughout a substantial portion of its length. Surrounding the clutch sleeve 53 and having a running fit therewith when the clutch sleeve is in its normal undistended position, is a steel pulley sleeve 55 and fastened to the pulley sleeve 55 by a set screw 56 is a pulley wheel 57. Communication between the lower surface of the diaphragm 45 and the annular space 24 between the liner 14 and the shaft 16 is established by one or more radial holes 58 extending through the sleeve 13 and its liner 14.

Disposed within each of the bearing supports 3 and 4 on either side of the bearings 6 and 9 are seal rings 59.

The operation of the extractor above described with reference to Figures 1, 2 and 3, is as follows:

The basket 33 is loaded with wet clothes in the usual fashion and power is delivered to the pulley wheel 57. If at this time there is no water pressure in the conduit 23 and in the annular space 24, there will be no clutching action between the clutch sleeve 53 and the pulley sleeve 55. However, when pressure is made available in the conduit 23, and consequently in the annular space 24, the cylindrical rubber diaphragm 45 will distend outwardly, thereby forcing the central portion of the bronze clutch sleeve into clutching engagement with the steel pulley sleeve 55. The rotation of the pulley 57 will, therefore, be transmitted through the clutch sleeve 55, the collar 52, the sleeve 13 and the converging lower end 15 of the liner 14 to the shaft 16, and through the shaft to the basket 33. It is apparent then that power can be transmitted to the basket only if and when the space 24 is under a fluid pressure. If the basket 33 (and its load) is not in dynamic balance, it will be displaced towards its "heavy" or overloaded side, thereby forcing the ridges 18 formed on the upper end of the shaft 16 into the corresponding side of the rubber liner 14. Simultaneously the shaft is pulled away from the diametrically opposed or "light" side of the liner, thereby establishing communication (as shown in Figure 3) between the annular space 24 and the inner ends of the radial conduits 35 on the "light" side of the basket and which in turn lead to the balancing cups 34. It should be particularly noted that although the upper end of the shaft 16 is free to move radially in any direction within the liner 14 by compressing the liner within the valleys formed by the ridges 18, the shaft, liner, sleeve 13 and basket 33 all rotate as a unit and consequently any water reaching the upper end of the liner 14 will be thrown radially outward over the flange 43 into the radially adjacent conduit 35, and hence to the vertical cup 34 communicating with that particular conduit. When enough water has been introduced into the cup 34 to bring the basket into dynamic balance, the shaft 16 will return to its normal position coaxial with the sleeve 13 and in so doing, the ridges 18 effectively will seal off the upper end of the liner. The upper ridged end of the shaft 16, the sleeve 13, and its liner 14, may therefore be considered as a valve responsive to any dynamic out-of-balance of the basket for automatically bringing the basket and its load into dynamic balance and for maintaining it continuously in that condition. One of the more important features of this valve resides in the valleys defined by the adjacent ridges 18 of the shaft. Although loosely characterized as compressible, rubber is actually incompressible. However, it is resilient and mobile and by providing valleys in the shaft into which the walls of rubber liner can be forced, it is possible to effect a substantial radial displacement of the shaft. A similar action could, of course, be obtained by providing ridges in the upper end of the liner and using a straight-walled shaft.

Sponge rubber can also be used, for in this case the rubber can be forced or compressed into its own internal cavities. In each case, the essential feature is the provision of spaces adjacent to or within the rubber into which it can be compressed.

When the basket 33 is rotated at such a speed that centrifugal force becomes a factor, the water in the clothes contained in the basket is thrown outwardly to the walls of the basket, and then through the holes 37 into the casing 1, from whence it is discharged through an outlet 61 to waste. After sufficient water has been extracted from the clothes in this manner, the water pressure in the conduit 23 is cut off, whereupon the rubber diaphragm 45 is deflated and the clutch sleeve 53 assumes its normally declutched position, so that no power is transmitted from the pulley wheel 57 to the shaft 16. Any water contained in the balancing cups 34 drops by gravity through its associated conduits 35 over the bottom 2 of the casing 1 to the discharge outlet 61. It is to be noted here that the channel 41 and ring 42 prevent the water being discharged from leaking into the bearing support 3.

If during the extracting cycle there is any leakage of water past the ridges 18 due not to the dynamically unbalanced condition of the basket and its contents but rather to an improper seating of the ridges 18 within the liner 14, water will pass through the distributing valve into one of the balancing cups 34. This action will, of course, overload the basket on the side in which this cup is located, thereby causing the distributing valve to open on the opposite side and to permit water to pass into the diametrically opposed balancing cups 34 until the basket has again been brought into dynamic balance. At this point, the original leakage referred to may again prevail permitting additional water to pass into the first mentioned balancing cup 34, which again will result in the operation of the distributing valve again to bring the basket into a state of dynamic balance. Eventually in this manner, the first balancing cup 34 will be completely filled with water, and at this point there will be leakage of water from this cup through its associated hole 39 into the basket and there will be no further "hunting" of the distributing valve. In other words, when the water level in any one of the distributing cups 34 has reached the level of its associated hole 39, water from the cup will pass through this hole into the extractor at the same rate as leakage into the cup, and due to this slight unbalance the distributing valve will continue to deliver water to the full and leaking cup.

Figure 4:
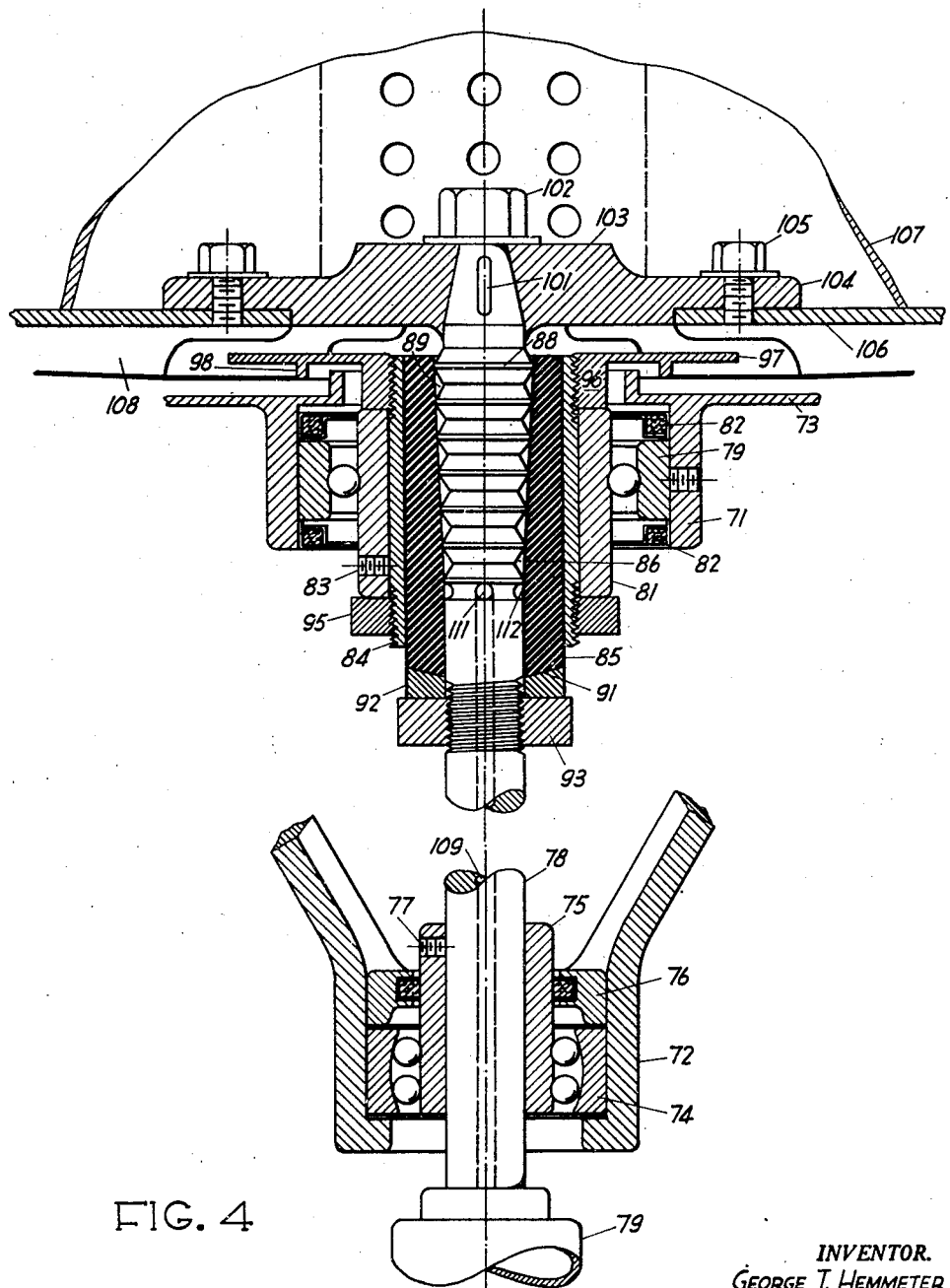
Figure 4 is a vertical section of a tapered balancing or distributing valve.
Figure 5:
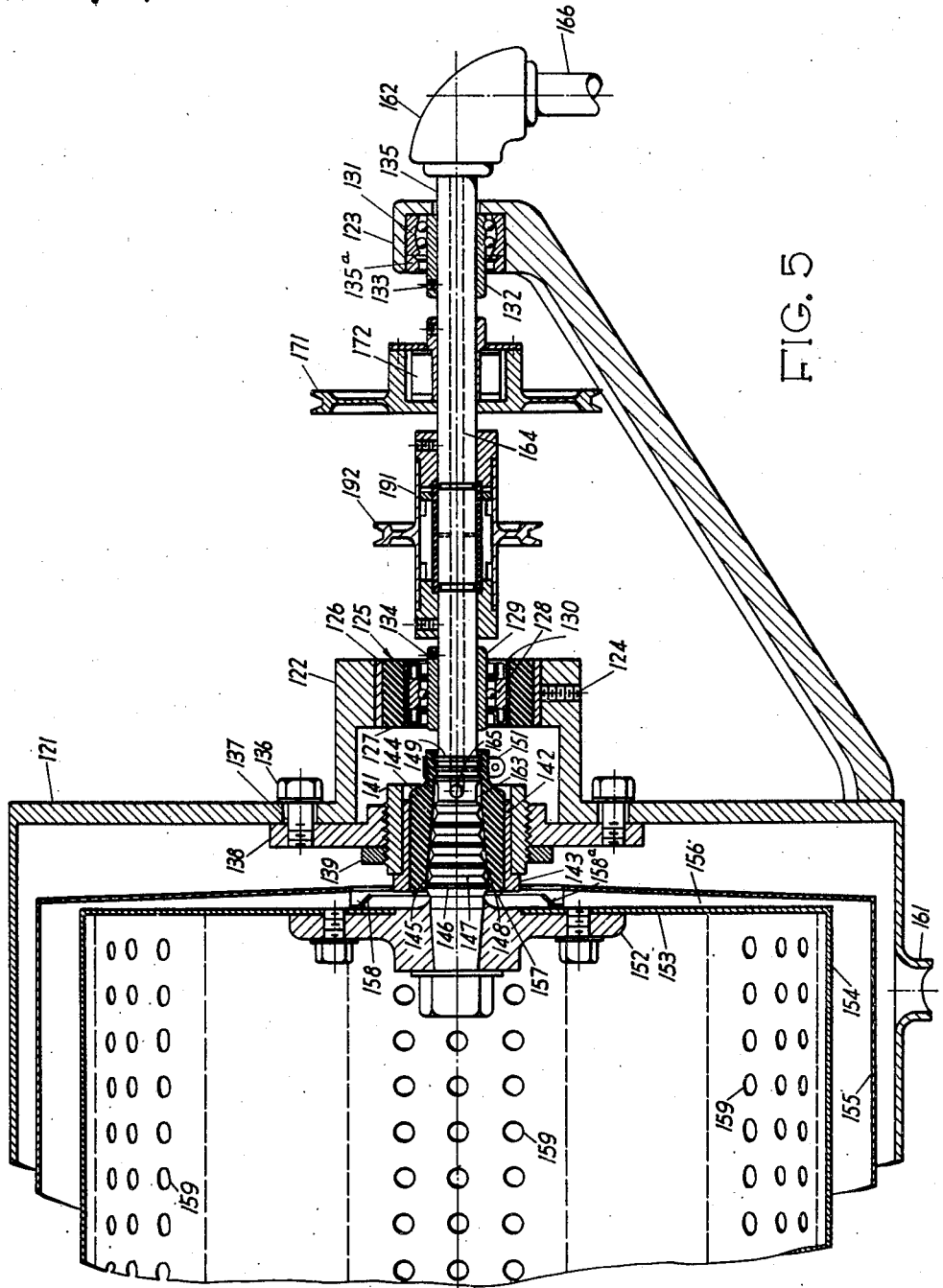
Figure 5 is a vertical section taken through a horizontal type washer including a tapered distributing valve and a fluid clutch.

In Figure 4, a vertical type extractor has been illustrated in which the weight of the basket is carried through the shaft directly by a thrust ball bearing capable of permitting a limited universal movement of the shaft, and in which the dynamic balance of the basket is effected by a vertically adjustable tapered distributing valve.

More specifically, this extractor comprises a pair of spaced vertically aligned bearing supports 71 and 72 carried by the bottom 73 or shell or casing of the extractor. Disposed within the bearing support 72 is a ball thrust bearing 74 including a bearing collar 75. Accommodated within the upper portion of the bearing support 72 and above the thrust bearing 74 is a seal ring 76. Fastened to the bearing sleeve 75 by a set screw 77 or other equivalent means is a shaft 78, the lower end of which communicates with a swivel joint 79 provided with a suitable stuffing box, ball bearing and thrust collar.

Located within the bearing support 71 is a ball bearing 79 including a bearing sleeve 81. Seated within the bearing support 71 on either side of the bearing 79 is a seal ring 82. Fastened within the bearing sleeve 81 by a set screw 83 is a collar 84 externally threaded at each end and within which is vulcanized a liner 85. The liner 85 is formed with a tapered bore 86 for the reception of a downwardly tapered portion of the shaft 78. This tapered portion of the shaft is provided with circular zones or ridges 88, the adjacent members of which define circular channels or valleys 89 into which the walls of the liner 85 can be compressed if for any reason the shaft is displaced radially. The external diameters of the ridges 88 and the internal diameter of the liner 85 should be such that when the shaft 78 is concentric with the liner 85, the ridges 88 are snugly fitted within the liner and form an effective water seal therewith. Disposed over the lower beveled end 91 of the liner 85 is a dished washer 92 and threaded to the shaft 78 in abutment with the washer 92 is a nut 93. By screwing the nut 93 against the dished washer 92, the beveled end 91 of the liner can effectively be sealed about the shaft, so as to form a watertight connection therewith. Threaded to the lower end of the sleeve 84 is a nut 95, and threaded to the upper end of this sleeve is a collar 96 formed with an outwardly extending flange 97, and which in turn is provided with a downwardly extending ring 98. Keeping in mind that the shaft 78 is fixed within its lower thrust bearing 74, it will be seen that by backing off the nut 95 and turning the collar 96, the sleeve 84 together with the liner 85 to which it is vulcanized or otherwise bonded, can be lowered and raised with respect to the shaft 78, and that consequently the fit between the ridges 88 and the tapered bore 86 can be adjusted at will.

Fastened to the upper end of the shaft 78 by a key 101 and a nut 102 is a hub 103 formed with a radial flange 104. Secured to the lower undercut surface of the flange 104 by bolts 105 is the bottom 106 of an extractor basket 107. Formed on the external peripheral walls of the basket 107 are a plurality of peripherally spaced balancing cups which communicate through radial conduits 108 with a zone immediately surrounding the upper end of the liner 85 beneath the hub 103. The basket 107, together with the balancing cups referred to, is made in substantial accordance with the basket 33 illustrated in Figures 1 and 2.

Extending through the shaft 78 is an axial bore 109 communicating at its lower end with the swivel joint 79, and at its upper end with a lateral bore 111. The bores 109 and 111, therefore, serve to establish communication between the swivel joint 97, which is in turn connected with a suitable source of water under pressure and an annular channel 112 formed in the shaft 78 below its lowermost ridge 88.

Although not shown, it is contemplated that power be transmitted to the shaft 78 by means of a fluid operated clutch such as illustrated in Figures 1 and 3.

The operation of the extractor as described with reference to Figure 4 is identical with the operation of the extractor illustrated in Figures 1, 2 and 3, although as above indicated, the weight of the basket 107 is carried through the shaft 78 through the ring 75 and the thrust bearing 74 directly by the lower bearing support 72, whereas in the modification illustrated in Figures 1 to 3 inclusive the load of the basket is transmitted to the lower bearing support 4 through the lower tapered end of the liner 14. Another essential difference between the modification illustrated in Figure 4 and that illustrated in Figures 1, 2 and 3 is with respect to the adjustable fit which can be obtained between the sleeve 85 and the ridges 88 of the shaft 78. Here again it is to be observed that instead of ridging the shaft 78, the sleeve 85 could be formed with ridges, or instead the sleeve could be formed of sponge rubber.

In Figures 5, 6, 7, 8 and 9 a combination washer and extractor of the horizontal type has been illustrated wherein the distributing valve for effecting the dynamic balance of the basket is adjustable with respect to the main load bearing so that the valve is substantially unaffected by the dead weight of the basket and is responsive solely to the dynamic unbalance of the extractor and its load. Furthermore in this modification power is transmitted to the basket during the washing cycle through an overrunning clutch and during the extracting cycle through a fluid operated clutch.

More specifically this modification comprises an outer shell or casing 121 supported by a suitable base not shown and which is provided with a pair of longitudinally aligned and spaced bearing supports 122 and 123. Fastened within the bearing support 122 by a set screw 124 is a resilient bearing retainer 125 comprising an outer metal ring 126 and an inner metal ring 130 both of which are vulcanized to a common rubber ring 127. Secured within the inner metal ring 130 is a ball bearing 128 including a bearing sleeve 129. Mounted within the bearing support 123 is a self-aligning ball bearing 131 including a bearing sleeve 132 and fastened within this sleeve and within the bearing sleeve 129 by set screws 133 and 134 is a shaft 135. Seated within the bearing support 123 in engagement with the outer ring of the bearing 131 is retaining ring 135a. Adjustably fastened to the rear wall of the casting 121, by bolts 136 extending through vertical slots 137 formed in the rear wall 121 is an internally threaded distributing valve supporting ring 138. Threaded within the ring 138 and adjustably locked thereto by a nut 139 is a bearing sleeve 141. Rotatably mounted within the sleeve 141 is a bushing 142 formed on its left hand end with a shoulder 143 and within which is vulcanized a rubber sleeve or liner 144, provided with a tapered bore 145. Formed on the shaft 135 within the liner 144, are a plurality of circular ridges 146, normally making a fluid tight seal with the liner and which define intervening valleys 147, into which portions of the liner can be forced upon a radial displacement of the shaft in any direction. Since the shaft 135 is held by the bearings 128 and 131 against any longitudinal displacement with respect to valve supporting ring 138, the advance of the liner 144 to the left by turning the collar 141 will effect a tighter fit between the liner and the ridges 146 of the shaft. When the desired fit between these two members has been obtained the right end of the liner is fastened and sealed to the shaft over the straight walled ridges 149, by a ring clamp 151.

Keyed and fastened to the left end of the shaft 135 is a hub 152 to which is bolted the rear end 153 of a spinner or basket 154. As in the case of the basket illustrated in Figures 1, 2 and 3, the basket 154 is provided on its periphery with a plurality of peripherally spaced, longitudinally extending balancing pockets or cups 155, communicating through radial conduits 156, with the circular opening 157 defined by the inner ends of the conduits. Secured to the end wall 153 of the basket, in line with the conduits 156, is a conical collar 158 formed with spaced holes 158a. Between the balancing pockets 155 the cylindrical walls of the basket 153 are formed with perforations 159, through which water can be slung from the basket into its surrounding casing and from there through the outlet 161.

Figure 6:
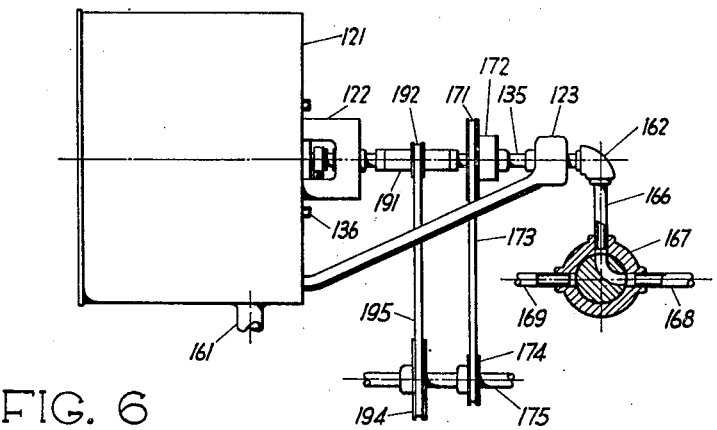
Figure 6 is a side elevation of the washer illustrated in Figure 5 diagrammatically showing the power transmission system.

Communication between a swivel joint 162 disposed on the right end of the shaft 135 and the channel 163 defined by the contiguous ridges 146 and 149, is established by longitudinal and transverse bores 164 and 165 formed in the shaft. As shown in Figure 6 the swivel joint 162 communicates through a pipe 166 with a three way valve 167, which in turn selectively communicates with either a source 168 of fluid under pressure or with an outlet relief line 169.

During the washing cycle of the basket 154 it is rotated at a relatively low speed through a large pulley wheel 171, operatively mounted on the shaft 135 through an overrunning clutch 172 of any suitable and conventional design. The pulley wheel 171 in turn is driven through a belt 173 by a small pulley wheel 174 keyed to a power driven shaft 175.

Figure 7:
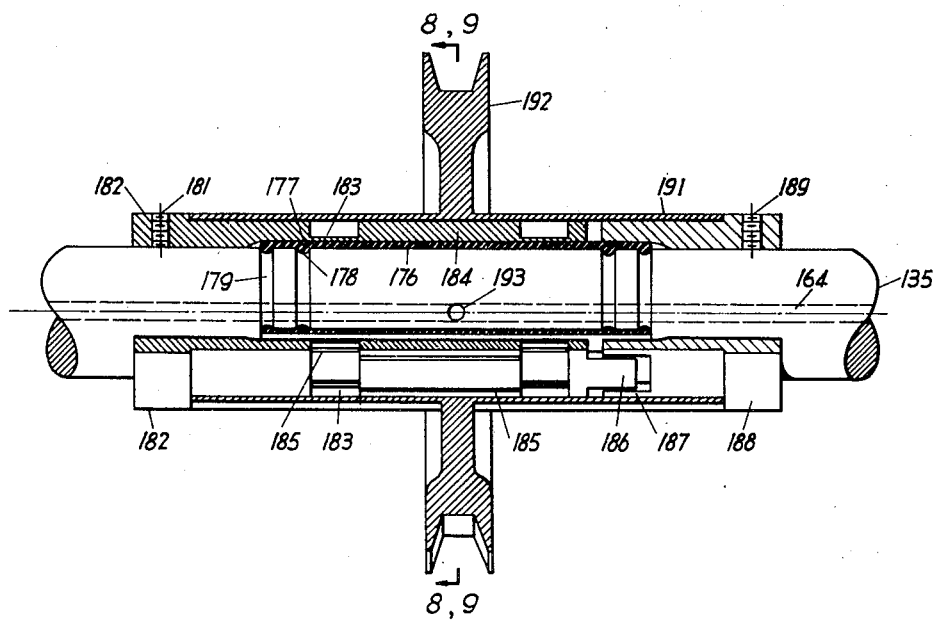
Figure 7 is a section taken through the fluid clutch of the washer and extractor illustrated in Figure 6.
Figure 8:
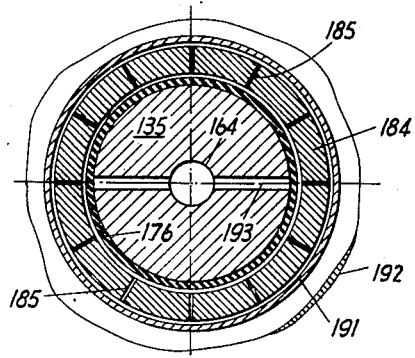
Figure 8 is a vertical section taken on the line 8—8 of Figure 7, but showing the clutch in its open or disengaged position.
Figure 9:
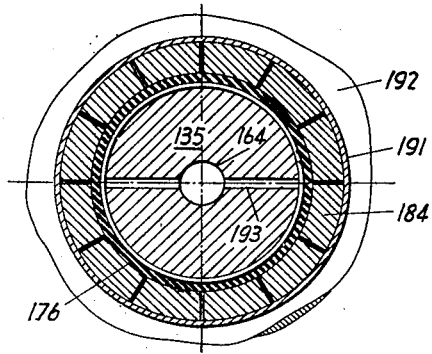
Figure 9 is a section similar to that illustrated in Figure 8, but showing the clutch in its closed or engaged position.

During the extracting cycle, the shaft 135 is driven at a relatively high speed through the fluid operated clutch shown in detail in Figure 7 with portions thereof broken away, better to illustrate its construction and in its inoperative and operative positions respectively in Figures 8 and 9. This clutch comprises a cylindrical rubber diaphragm 176, surrounding the shaft 135 and sealed thereto at either end by wire clamps 177 and annular heads 178 having a snug fit within circular channels 179 formed in the shaft.

Surrounding the diaphragm 176 and secured to the shaft by a set screw 181, is a bronze clutch sleeve 182, the walls of which at the longitudinally spaced annular zones 183 are of materially reduced thickness so that the central zone 184 of the sleeve can be forced radially outward upon the application of outwardly directed fluid pressure to the interior of the rubber diaphragm as shown in Figure 9. To further permit the outward distension of the clutch sleeve 182 it is formed with a plurality of peripherally spaced longitudinally extending slots 185 (see Figures 8 and 9). The right end of the sleeve 182 is formed with a plurality of peripherally spaced splines 186 arranged to interlock with a set of complementary splines 187 of a relatively short bearing sleeve 188, secured to the shaft 135, by a set screw 189. Journaled on the sleeves 182 and 188 is a pulley sleeve 191 provided with a relatively small pulley wheel 192. Communication between the axial bore 164, of the shaft 135 and the under side of the diaphragm 176, is established through a transverse bore 193 provided in the shaft in the plane of the pulley wheel 192. Although normally the pulley sleeve 191 has a free running fit with the bearing surfaces of the sleeves 182 and 188, an application of fluid pressure to the under side of the rubber diaphragm 176 through the transverse bore 193 will distend the diaphragm and in turn the central zone 184 of the clutch sleeve 182 so as to lock the clutch sleeve 182 to the pulley sleeve 191. The torque of the pulley 192 is thereby transmitted to the shaft 135, through the clutch sleeve 182 and through the sleeve 188, the splines 186 of the former being interdigitated with the mating splines 187 of the latter.

As shown in Figure 6 power from the motor driven shaft 175, is transmitted to the relatively small pulley wheel 192, through a relatively large pulley wheel 194, keyed to the shaft 175, and a belt 195 passing about these two pulley wheels.

Before placing the combined washer and extractor above described into operation, the dynamically balancing distributing valve associated with the left end of the shaft is adjusted so that it does not carry any part of the weight of the basket or the shaft. This is done by loosening the bolts 136, thereby permitting the entire weight of the basket and shaft to be supported by the bearings 128 and 131, and permitting the valve supporting ring 138 and its associated parts including the rubber liner 144, to assume a position coaxial with the shaft in the displaced position of the shaft. The bolts 136 are then tightened and the sealing fit between the liner 144 and the ridges 146 of the shaft is then adjusted as previously described so that the valve will not leak when the basket has been loaded to its average wet capacity. As so adjusted the compression between the liner and the ridges 146 is equal at all points, except as indirectly affected by the weight of the wet load. When however the basket is rotated at such speeds that centrifugal force becomes a factor any dynamic unbalance of the basket will produce a radial displacement of the shaft within the liner in the direction of the "heavy" side of the basket thereby producing a passageway between the shaft and the liner along the opposed side of the shaft. The passageway so formed along the "light" side of the shaft establishes communication between the pipe 166 and the outer end of the liner at a point adjacent one of the radial conduits 156 communicating with one of the balancing pockets 155 on the "light" side of the basket. In its outward travel the balancing water passes over the holes 158a of the conical collar 158, whereas when the speed of rotation of the basket is decreased to a point where the centrifugal force is not sufficient to overcome the force of gravity, any balancing water contained in the pockets 155 falls through the conduits 156 on the upper side of the basket, over the upper inclined surface of the conical collar 158, and through the circular opening 157 to the outlet 161. During the washing cycle of the basket it is rotated at a relatively slow speed through the overrunning pulley wheel 171, with the valve 167 in its closed position. When it is desired to extract water from the clothes contained within the basket, the valve 167 is turned to its open or pressure position as shown in Figure 6, whereupon the diaphragm 176 is distended thereby causing the clutch sleeve 182 to engage the relatively small pulley wheel 192. Since the pulley wheel 192 is turning at a higher speed than the pulley wheel 171, the latter pulley wheel simply overruns and permits the pulley wheel 192 to carry the load. It should be particularly noted that since the balancing fluid distributing valve and the fluid operated clutch associated with the pulley wheel 192 are both responsive to the same fluid pressure, the basket 154 can be driven at higher or extracting speed only when the distributing valve is operative to effect and maintain the dynamic balance of the basket.

Figure 11:
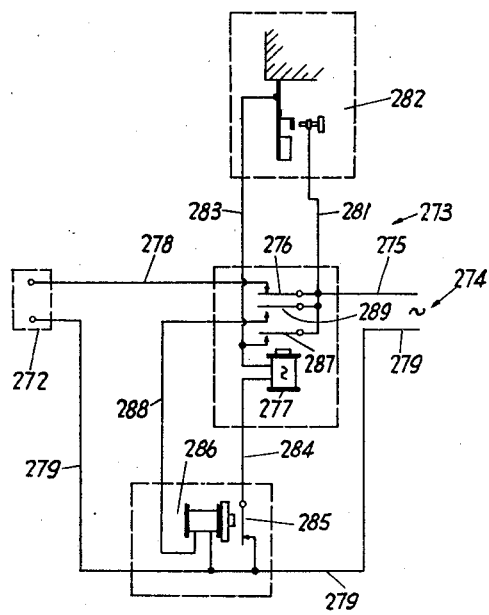
Figure 11 is a diagrammatic illustration of the inertia switch circuit used in conjunction with the fluid controlled transmission system shown in Figure 10.
Figure 10:
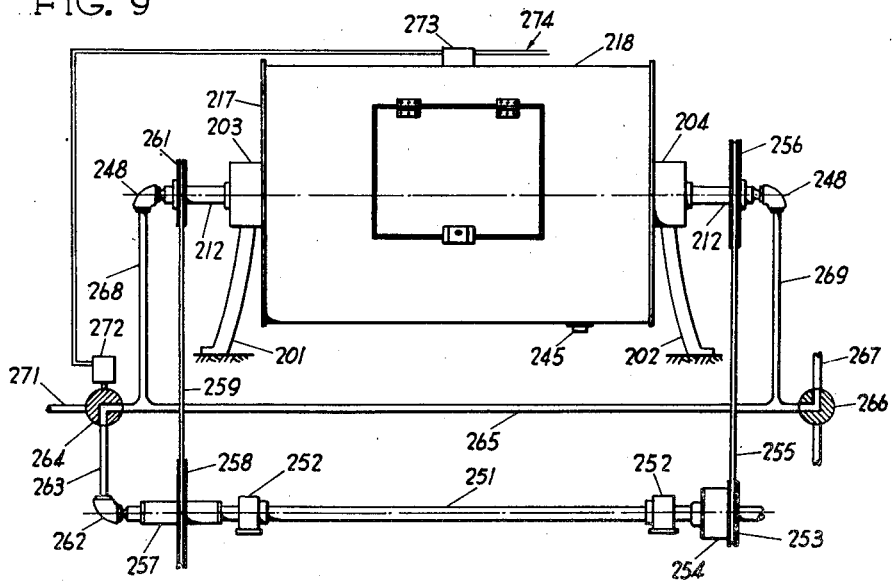
Figure 10 is a diagrammatic illustration of a combined washer and extractor and the fluid controlled transmission system for driving it.

In Figures 10, 11 and 12 the objects of my invention have been embodied in a commercial type of a combined washer and extractor supported at either end by trunnions provided with independent balancing valves and with independent drives. In this modification the basket can be brought up to extracting speed only under the control of an inertia switch and only while the balancing valves are operative. Here as in the case of the modification illustrated in Figures 5 to 9 inclusive, the operation of the distributing valves is entirely independent of the weight of the basket and its shafts.

More specifically this modification comprises frame members 201 and 202 provided respectively with opposed axially aligned bearing supports 203 and 204. Associated with each of these supports are identical bearings and balancing valves and consequently a description of only one set of these members is necessary. Accommodated within the bearing support 203 is a resilient rubber bushing 205 vulcanized on its outer surface to a bronze liner 206 and on its inner surface to a bronze supporting sleeve 207, formed with a shoulder 208. Seated within the supporting sleeve 207, in abutment with the shoulder 208, is a ball bearing 209, including a bearing sleeve 211, secured to a trunnion 212 by a set screw 213. Adjustably secured within the supporting sleeve 207 in back of the bearing 209 by a set screw 214, is a collar 215, serving to lock the bearing in place. Fastened over the back end of the bearing support 203, is a cover plate 216.

The bearing support 203, is formed integrally with the left head 217 of the shell or casing 218, and adjustably secured to the head 217 over the forward end of the bearing support 203 by bolts 219 passing through vertical slots 221, is an internally threaded collar 222. Accommodated within the collar 222 is a ball bearing 223 including a bearing sleeve 224. Vulcanized to the inner surface of the sleeve 224 is a rubber liner 225 formed with a tapered bore. Formed on the trunnion 212 and having a fluid tight fit with this bore is the corrugated or ridged portion 226. Threaded to the collar 222 in back of the bearing 223 is an adjusting nut 227, by which the liner 225 can be advanced or retracted along the ridged portion 226 to vary the fit between these two members.

Keyed and fastened to the inner end of the trunnion 212 by a nut 228 is a hub 229, to which is secured the left dished head 231 of a spinner or basket 232, formed with perforations 233. The basket is provided at either end with a plurality of diametrically opposed pairs of balancing cups or pockets 234 for the reception of balancing water under the control of the balancing valve. The pockets 234 are defined by the cylindrical extensions 235 of the basket, by the end rings 236 partially closing the ends of these extensions, by the heads 231, and by diametrically opposed pairs of radial partitions 237 secured to these various members.

Secured to each of the dished heads 231 is an outwardly converging guide cone 238 provided on its inner surface with a plurality of diametrically opposed pairs of guide vanes 239, each in radial alignment with one of the radial partitions 237. The cone 238 and its adjacent pairs of guide vanes therefore form inwardly inclined channels for the passage of balancing water from the balancing valve to the balancing pockets 234 through holes 241 in the inner end of the cone, under the influence of centrifugal force. Secured to the trunnion 212 by a set screw 243 adjacent the right end of the liner 225 is a conical slinger 242. Secured to each of the end rings 236 is an inclined baffle ring 244 which serves to deflect inwardly any water falling from the balancing pockets 234. Any water falling from the balancing pockets travels down the surface of the cone 238, down the inner surface of the casing head to 217, and then along the bottom of the stationary casing 218 to an outlet 245.

Each of the trunnions 212 is provided with intersecting axial and transverse bores 246 and 247 respectively, for establishing communication between a swivel joint 248 carried on the outer end of each trunnion and the balancing valve associated with the trunnion.

For driving the basket 232 at a relatively low speed during its washing cycle and at a relatively high speed during its extracting cycle, I provide as shown in Figure 10, a power driven drive shaft 251 journaled in bearings 252 and driven at a uniform predetermined speed. Carried by the right end of the shaft 251, is a relatively small pulley wheel 253 provided with an overrunning clutch 254 in the same manner as is the pulley wheel 171 illustrated in Figure 5. Power from the pulley wheel 253 is transmitted to the right trunnion 212 through a belt 255 and a relatively large pulley wheel 256 keyed to the right trunnion 212. Mounted on the left end of the drive shaft 251 through a fluid operated clutch 257 (made in the same manner as the fluid operated clutch illustrated in Figure 7), is a relatively large pulley wheel 258. Power from the pulley wheel 258 is transmitted to the left trunnion 212 through a belt 259, and a relatively small pulley wheel 261 keyed to the trunnion 212.

Mounted on the left end of the drive shaft 251 is a swivel joint 262, communicating through a line 263, a three-way solenoid operated valve 264, a line 265 and a hand operated three-way valve 266 with a source 267 of fluid under pressure. The line 265 communicates directly with the left swivel joint 248 through a line 268 and directly with the right swivel joint 248 through a line 269. The valve 264 is provided with a discharge relief connection 271 and is actuated by a solenoid 272, in circuit with an inertia switch 273, mounted on the shell or casing 218.

The inertia switch 273 and its circuit as diagrammatically shown in Figure 11 comprises a power line 274, having a leg 275 in circuit with a normally closed switch 276 actuated by a solenoid 277, a line 278, the coil of the solenoid 272 which controls the valve 264, and the other leg 279 of the power line 274. Connected to the leg 275 ahead of the normally closed switch 276 is a line 281 in series with a normally open inertia responsive switch 282, a line 283, the coil of the solenoid 277, the line 284, a normally closed switch 285 actuated by the solenoid 286 of an automatic reset time relay and the return leg 279. Shunted across the lines 281 and 283 is a normally open switch 287 actuated by the solenoid 277 and across the legs 275 and 279 through the coil of the time delayed relay 286 and a line 288 is a normally open relay switch 289 also actuated by the solenoid 277.

The normally open inertia responsive switch 282 (more specifically described in my application Patent No. 2,461,643, issued February 15, 1949, can be adjusted to close in response to any vibration having an amplitude greater than any predetermined value. If then the extractor casing 218 on which the inertia switch above described is mounted, is either not vibrating or the amplitude of its vibrations are below the predetermined value for which it is set, current will pass through the leg 275, the normally closed switch 276, the line 278, and the solenoid 272 to the return leg 279. In this position of the solenoid 272 the valve 264, as shown in Figure 10, will establish communication between the source of fluid under pressure and the fluid operated clutch 257, thereby permitting the pulley wheel 258 to transmit power to the basket. If however the amplitude of vibration of the casing 218 is greater than the value for which the inertia switch is set, the inertia switch 282 will momentarily close, thereby energizing the solenoid 277 which in turn will open the normally closed switch 276 and simultaneously close the normally open switches 287 and 289. With the switch 287 in its closed position the coil of the solenoid 277 is placed directly across the power line 274 and therefore the solenoid 277 remains energized even though the inertia switch is only momentarily closed. The closing of the relay switch 289 energizes the clock mechanism (not shown) of the time delay relay 286 through the line 279 and at a predetermined interval of time the solenoid of this relay momentarily opens the switch 285 thereby de-energizing the solenoid 277 and returning the entire circuit to its original condition. The automatic reset on the time delayed relay 286 also returns to its initial position. By this expedient then the basket 232 can be brought into dynamic balance and full extracting speed without any resulting vibration of an amplitude greater than a predetermined set value.

From Figure 10 it will be seen that during the washing cycle power is transmitted to the basket only through the right trunnion 212, the large pulley wheel 256, the belt 255 and the small pulley wheel 253 and its associated overrunning clutch 254. During this cycle of operation the valve 266 is in its closed position. To operate the basket as an extractor the valve 266 is turned so as to place the lines 265 and 269 in communication with the source 267 of fluid under pressure, and precaution is taken to see that the electric power line 274 is closed. Under these conditions power will be transmitted from the drive shaft 251 through the fluid operated clutch 257, the large pulley wheel 258, the belt 259 and the small pulley wheel 261 to the left trunnion 212. Due to the inverse ratios between the diameters of the four pulley wheels involved the small pulley wheel 261 will drive the left trunnion 212 at a greater speed than the large pulley wheel 256 can drive the right trunnion. However since both trunnions are keyed to the basket, the pulley wheel 256 must of necessity rotate with the pulley wheel 251 and this is made possible by virtue of the overrunning clutch 254 associated with the small pulley wheel 253. It is here to be noted that the overrunning clutch 254 can be mounted on the right trunnion 212 rather than on the pulley wheel 253. During the extracting cycle the balancing valves associated with each of the trunnions operate as previously described to bring the basket into dynamic balance and to maintain it in that condition throughout this cycle of operation.

Figure 13:
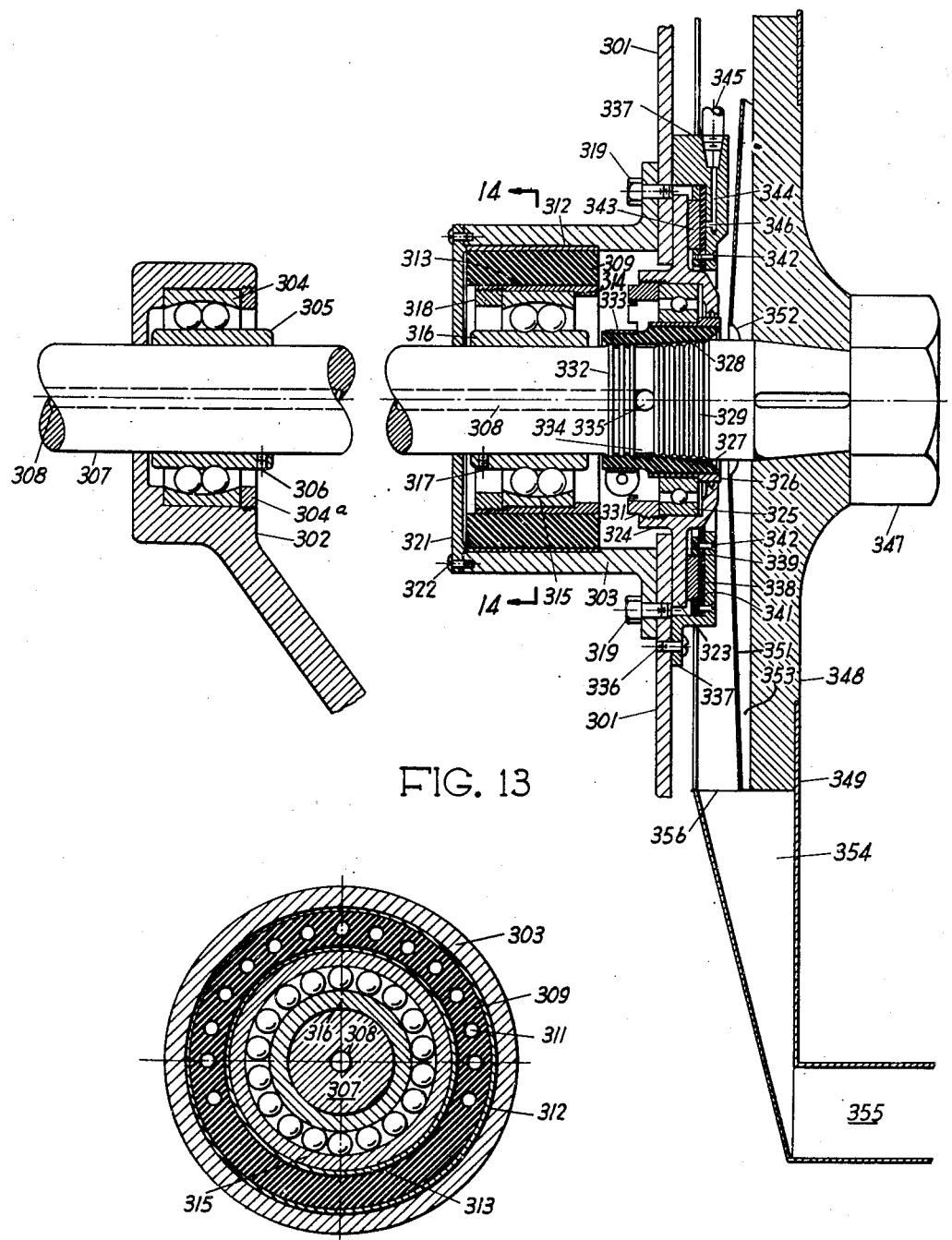
Figure 13 is a partial vertical section of a combination washer and extractor provided with a fluid operated lock for locking a balancing valve in an unstressed condition and fixed position about the basket shaft.
Figure 14:
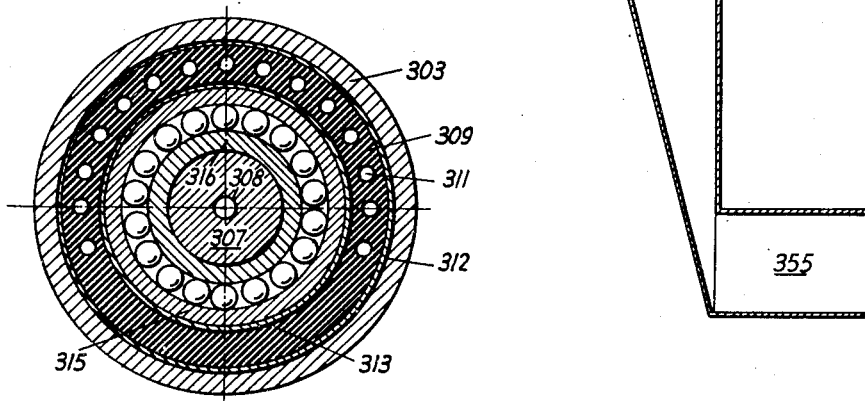
Figure 14 is a section taken on the line 14—14 of Figure 13.

In Figures 13 and 14 I have illustrated a combination washer and extractor wherein a fluid lock is provided for holding the balancing valve in such a radially adjusted position with respect to the main bearing carrying the load of the basket and its shaft or trunnion, that the balancing valve is responsive only to the dynamic unbalance of the basket irrespective of the weight of the basket.

More particularly this modification comprises a fixed shell or casing 301 from which is supported a pair of axially aligned and spaced bearing supports 302 and 303. Accommodated within the bearing support 302 is a self aligning bearing 304 including a bearing sleeve 305. Threaded within the bearing support 302 is a lock nut 304a. Fastened within the sleeve 305 by a set screw 306, is a trunnion or shaft 307 provided with an axial bore 308.

Accommodated within the bearing support 303 is a resilient rubber bushing 309 preferably formed with a plurality of peripherally spaced longitudinally extending holes 311. From Figure 14 it is to be noted that these holes are formed only in that portion of the bushing not subject to the dead weight of the shaft as transmitted to the bushing by the sleeve 313. By the use of holes so disposed, the resiliency or compressibility of cored portion of the bushing is greater than that of the weight bearing portion. Vulcanized to the outer surface of the bushing 309 is a bronze liner 312 and to its inner surface, an internally threaded bronze supporting sleeve 313, provided with a shoulder 314. Seated within the supporting sleeve 313 is a self aligning ball bearing 315, including a bearing sleeve 316 fastened to the shaft 307 by a set screw 317. Threaded in the supporting sleeve 313 in back of the ball bearing 315 is a nut 318 for locking the bearing in abutment with the shoulder 314. The bearing support 303 is removably fastened to the casing 301 by bolts 319 and is closed by a cover plate 321 fastened thereto by screws 322.

Seated on the forward or right face of the casing 301 is the flange 323 of an internally threaded bearing and balancing valve housing 324. Accommodated within the housing 324 is a ball bearing 325 which in turn is seated within a shouldered supporting sleeve 326. Vulcanized to the supporting sleeve 326 is a rubber liner 327 formed with a tapered bore 328 normally having a fluid tight seal with the adjacent tapered and ridged portion 329 of the shaft 307. Threaded within the housing 324 is an annular adjusting nut 331 (fitted with a locking device not shown) by which the rubber liner 327 can be advanced over the tapered and ridged portion 329, to adjust the sealing fit between these two members. After this adjustment has been made the left end of the liner 327 is clamped and sealed over the straight walled ridges 332 of the shaft, by a ring clamp 333. Communication between the axial bore 308 and a peripheral channel 334 formed on the shaft to the right of the ridges 332 is established by a transverse bore 335.

Removably fastened to the right face of the casing 301 by screws 336 is a housing 337. Disposed over the inner face of the housing is a distensible rubber diaphragm ring 338 the peripheral edges of which are sealed to the plate by clamping rings 339 and 341, held in place by screws 342. Accommodated within the annular channel formed by the clamping rings 339 and 341 and between the distensible rubber ring 338 and the flange 323, is locking ring 343. Formed in the annular housing 337 is a passageway 344 establishing communication between a conduit 345 and a circular channel 346 formed in the housing adjacent the diaphragm ring. The conduit 345 in turn communicates with the same source of fluid under pressure as does the bore 308 in the shaft 307.

Keyed to the shaft 307 and secured thereto by a nut 347 is a hub 348 of a basket 349. Mounted on the hub 348 is a slinger 351 provided with internal radial partitions 352 forming passageways 353 in radial alignment with conduits 354 carried by the basket 349 and communicating with peripherally disposed balancing pockets 355 formed on the basket 349. It is to be noted that the open ends 356 of the conduits 354 extend beyond the hub to receive the balancing fluid from the slinger during the balancing cycle to provide a passageway for the discharge of the balancing fluid.

In this modification the shaft 307 due to the weight of the basket 349 assumes a position within the bearing support 303, below the axis of the support 303 rather than coaxial therewith, this action being permitted by the resiliency of the rubber bushing 309. Since the balancing valve housing 324, normally is free to move vertically with respect to the casing 301, the housing and its associated bearing and balancing valve maintain a position coaxial with the shaft. Preferably the washing cycle is carried out with the balancing valve in this condition. During this cycle of operation the basket is rotated below a speed at which centrifugal force becomes a factor insofar as the dynamic unbalance of the basket is concerned and consequently there is no necessity of bringing the balancing valve into play.

At the end of the washing cycle and with the basket still rotating at washing speed the bore 308 and the conduit 345 are placed in communication with a source of fluid under pressure. The resulting fluid pressure on the right side of the diaphragm ring 338 immediately locks the valve housing 324 to the stationary casing 301 with the balancing valve liner 327 coaxial with the shaft 307 irrespective of the position which the shaft has assumed within the bearing support 303. In this position no part of the weight of the shaft or the basket and its load is carried by the liner 327. If however the basket and its load are not in dynamic balance the shaft will be displaced radially towards the "heavy" side of the basket, thereby compressing the liner 327 on that side and producing a passageway between the shaft and the liner on the "light" side. Fluid is thereby delivered through the balancing valve to the balancing pockets on the "light" side of the basket until such time as the basket and its load are brought into dynamic balance. At this point there is no radial displacement of the shaft and consequently the balancing valve assumes its closed position and remains closed until the basket again becomes dynamically unbalanced, whereupon the above cycle of operation is repeated.

Although the liner 327 rotates with the shaft, it is to be observed that the rubber bushing 309 is stationary and that consequently any radial displacement of the shaft caused by the dynamic unbalance of the basket, produces a progressive compression in the bushing over its entire periphery during each revolution of the shaft. The lower side of the bushing therefore is subjected to the weight of the shaft, the basket and its load being statically and also periodically (once during each revolution of the shaft) subjected to the force resulting from the dynamic unbalance of the basket and its load in addition to the static load. The two sides of the bushing are subjected only to the dynamic or unbalanced force of rotation and its top only to the excess of the dynamic force over the dead weight of the basket, the load and the shaft.

In order to attain a high average displacement of the shaft for actuating the balancing valve in response to any dynamic unbalanced force and at the same time to provide sufficient support for the reinforced downward load (dead weight plus dynamic force) the rubber bushing is made solid beneath the supporting sleeve 313, whereas in order to make the bushing more resilient in the horizontal and upward directions, resort is had to the coring holes 311. By this expedient a maximum average radial displacement can be attained without unduly high stresses being imposed on the rubber bushing.

This application is a continuation in part of my copending application Serial No. 527,318, filed March 20, 1944, for "Dynamic balancer." That application has now matured as Patent No. 2,461,643 patented February 15, 1949.

I claim:

1. An extractor comprising: a frame; a sleeve rotatably mounted on said frame; an elastomer liner bonded to and within said sleeve; a radially displaceable shaft extending through said liner and secured and sealed to one end thereof, the contours of said shaft and liner which are immediately adjacent to each other being such that normally they form a fluid tight seal with each other along spaced circular zones and intermediate these zones define circular channels; a perforate basket fixed to said shaft adjacent the free end of said liner and provided with a plurality of peripherally spaced balancing pockets; conduits for establishing communication between said pockets and an annular zone surrounding the free end of said liner; means for establishing communication between a source of fluid under pressure and one of said circular channels; and means for driving said shaft.

2. An extractor comprising: a frame; a sleeve rotatably mounted on said frame; an elastomer liner bonded to and within said sleeve; a shaft extending through said liner and secured and sealed to one end thereof, said shaft being provided with a plurality of longitudinally spaced circular ridges normally effecting a fluid tight seal with a portion of said liner; a perforate basket fixed to said shaft adjacent the free end of said liner and provided with a plurality of peripherally spaced balancing pockets; conduits for establishing communication between said pockets and an annular zone surrounding the free end of said liner; means for establishing communication between a source of fluid under pressure and the valley defined by an adjacent pair of said ridges; and means for driving said shaft.

3. An extractor comprising: a frame; a sleeve rotatably mounted on said frame; an elastomer liner bonded to and within said sleeve and provided with a tapered bore; a shaft extending through said liner and secured and sealed to one end thereof, said shaft being provided with an enlarged tapered peripherally ridged portion normally making a fluid tight seal with said liner; a perforate basket fixed to said shaft adjacent the free end of said liner and provided with a plurality of peripherally spaced balancing pockets; conduits for establishing communication between said pockets and an annular zone surrounding the free end of said liner; means for moving said liner longitudinally along said shaft; means for establishing communication between a source of fluid under pressure and said shaft at a point on said shaft within the length of said liner; and means for driving said shaft.

4. An extractor comprising: a casing; a sleeve mounted on said casing for rotation on a vertical axis; an elastomer liner bonded within and to said sleeve; a shaft extending through said liner and secured and sealed to the lower end thereof, the upper portion of said shaft normally making a fluid tight seal with said liner; a perforate basket mounted on the upper end of said shaft within said casing and formed with a plurality of peripherally spaced balancing pockets and with holes through the upper ends of its walls for establishing communication between the interior of said basket and the upper ends of said balancing pockets; means for establishing communication between a source of fluid under pressure and said shaft at a point on said shaft within the length of said liner; means for establishing communication between said point and said pockets; and means for driving said shaft.

5. An extractor comprising: a frame; a sleeve rotatably mounted on said frame; an elastomer liner member bonded to and within said sleeve; a shaft member extending through said liner and secured and sealed to one end thereof, one of said members being formed with corrugations arranged normally to form a fluid-tight seal with said other member; a perforate basket fixed to said shaft adjacent the free end of said liner and provided with a plurality of peripherally spaced balancing pockets; passageways extending between said pockets and points immediately adjacent the free end of said liner; a fluid operated clutch mounted on said sleeve; a pulley wheel mounted on said clutch; and means for simultaneously establishing communication between said clutch and said source of fluid under pressure and between said source of fluid under pressure and the valley defined by an adjacent pair of said corrugations.

6. An extractor comprising: a casing; first and second coaxial bearing supports carried by said casing, said first support being located adjacent said casing; a bearing mounted in said second support; a bearing resiliently mounted in said first support for limited radial displacement therein; a valve sleeve mounted on said casing adjacent said first bearing support and arranged for transverse adjustment with respect thereto; an elastomer liner bonded to and within said sleeve; a shaft mounted in said bearings and extending through said liner, one end of said liner being secured and sealed to and about said shaft and the adjacent portions of said shaft and liner being such that normally they form a fluid tight seal with each other along spaced circular zones and intermediate these zones define circular channels; a perforate basket fixed to said shaft adjacent the free end of said liner and provided with a plurality of peripherally spaced balancing pockets; means for establishing communication between a source of fluid under pressure and a circular channel defined by said shaft and liner; and means for driving said shaft.

7. An extractor comprising: a shaft; a rotary basket mounted on said shaft and provided with a plurality of peripherally spaced balancing pockets; a fluid conduit system including a balancing valve responsive to any substantial dynamic unbalance of said basket for selectively delivering fluid to one of said balancing pockets on the "light" side of the basket; a pulley operatively associated with said shaft through a fluid operated clutch; and means for simultaneously establishing communication between a source of fluid under pressure, said fluid system and said fluid operated clutch so that said shaft can be driven by said pulley wheel only when the balancing valve is under the influence of said fluid under pressure.

8. In a combination washer and extractor: a rotary shaft resiliently supported at one end thereof for limited radial displacement; a basket mounted on the latter end of said shaft adapted to be driven at such speed as to produce gyrations under unbalanced conditions and provided with a plurality of peripherally spaced balancing pockets; a balancing valve formed about said shaft adjacent said basket and responsive to any substantial gyration of the shaft for selectively delivering balancing fluid to one of the pockets on the "light" side of the basket; means for driving said shaft including a fluid operated clutch; a conduit for simultaneously delivering fluid under pressure to said balancing valve and fluid operated clutch; a solenoid operated valve disposed in said conduit for controlling the passage of fluid therethrough; and an inertia switch in circuit with said solenoid and responsive to vibrations of said basket.

9. A combination washer and extractor comprising: a cylindrical casing; coaxial bearings resiliently mounted on each end of said casing; a basket provided at either end with trunnions mounted in said bearings and with a plurality of peripherally spaced balancing pockets; a balancing valve formed about each of said trunnions adjacent said basket and responsive to any substantial gyrations thereof for selectively delivering fluid under pressure to the pockets on the "light" side of the basket; means for vertically adjusting said balancing valves so that they are not influenced by the dead weight of said basket or its load; and means for driving one of said trunnions at washing speed and the other at extracting speed.

10. A combination washer and extractor comprising: a cylindrical casing; a basket resiliently mounted in said casing for limited gyratory movement with respect to its normal axis in response to any substantial dynamic unbalance of the basket; peripherally spaced balancing pockets carried by said basket; a fluid system including valve means associated with said basket responsive to any substantial gyrations thereof for delivering fluid to one of said pockets on the "light" side of said basket; means associated with said basket including an overrunning clutch for driving said basket at a relatively slow speed during its washing cycle; means associated with said basket including a fluid operated clutch for driving said basket at a relatively high speed during its extracting cycle; and means for rendering said latter clutch operative only when said valve means is under the influence of a fluid under pressure.

11. A combination washer and extractor comprising: a cylindrical casing; coaxial trunnion bearings resiliently mounted in either end of said casing; trunnions mounted in each of said bearings; a basket mounted on and between said trunnions; a valve sleeve supporting member surrounding each of said trunnions and secured to said casing for vertical adjustment therewith; a valve sleeve journaled in said supporting member; an elastomer liner bonded to and within each of said valve sleeves in sealing engagement with its associated trunnion and secured thereto at its outer end, each of said liners being arranged to be radially compressed on one side thereof by its associated trunnion in response to any substantial out-of-balance of said basket and to form a fluid passageway along said trunnion on the opposite side thereof; a plurality of peripherally spaced balancing pockets carried by said basket at each end thereof; an outwardly converging cone carried by each end of said basket coaxial with said trunnions and provided with holes around its upper periphery in radial alignment with said pockets; a plurality of longitudinally extending spaced vanes secured to the interior of said cone and forming therewith longitudinal passageways in radial alignment with said pockets; a slinger mounted on each of said trunnions adjacent the free end of the liner associated therewith; means for establishing communication between a source of fluid under pressure and the interior surface of each of said liners; drive means associated with one of said trunnions for rotating said basket at a relatively low speed during its washing cycle; and drive means associated with the other of said trunnions for rotating said basket at a relatively high speed during its extracting cycle.

12. An extractor comprising: a casing; a bearing support mounted on said casing on a fixed axis; a bearing resiliently mounted in said support; a shaft mounted in said bearing; a valve sleeve housing surrounding said shaft in abutment with a wall of said casing; a valve sleeve journaled in said housing; an elastomer liner bonded to and within said valve sleeve, said shaft and liner being normally in liquid tight sealing engagement with each other but upon lateral movement toward each other on one side thereof defining a longitudinal passageway therebetween on the diametrically opposite side thereof; a lock housing surrounding said sleeve housing; a locking ring accommodated within said lock housing in engagement with said sleeve housing; an elastomer ring sealed around its edges to the inner face of said lock housing; a basket mounted on the end of said shaft adjacent said lock housing; peripherally spaced balancing pockets carried by said basket; radial conduits carried by said basket for establishing communication between said pockets and an annular zone surrounding said shaft; and means for establishing communication between the inner face of said elastomer ring and a source of fluid under pressure and for simultaneously establishing communication between said source and a point between said shaft and said liner.

13. An extractor comprising: a vertically disposed cylindrical casing having a bottom provided with a central opening; a pair of axially aligned and spaced bearings supported by and depending from said casing in alignment with said opening; a sleeve journaled in said bearings with its upper end extending through said opening; an elastomer liner bonded to and within said sleeve and provided at its lower end with a tapered shaft seat; a shaft extending through said liner, said shaft being provided at its lower end with an enlarged tapered plug seated and sealed within and to said tapered shaft seat and at its upper end with circular ridges normally in sealing engagement with the upper end of said liner; a perforate basket mounted on the upper end of said shaft for rotation therewith and provided on its outer surface with a plurality of peripherally spaced longitudinally extending balancing pockets; inwardly extending radial conduits provided along the bottom of said basket and terminating at points adjacent said liner, said conduits serving to establish communication between said pockets and an annular zone surrounding the upper end of said liner; means for establishing communication between a source of fluid pressure and the interior surface of said liner; and means for rotating said sleeve.

14. An extractor comprising: a vertically disposed cylindrical casing having a bottom provided with a central opening; a vertical sleeve supported by said casing coaxially with said opening; an elastomer liner bonded to and sealed within said sleeve, and formed at its lower end with a downwardly tapered shaft seat; a laterally displaceable shaft extending through said liner and having a tapered lower end seated and sealed within and to said shaft seat, said shaft being formed at its upper end with a series of circular ridges normally in sealing engagement with said liner; a perforate basket mounted on the upper end of said shaft for rotation therewith and provided with a series of peripherally spaced longitudinally extending balancing pockets and with radially extending radial conduits terminating at points adjacent said liner, said conduits serving to establish communication between the lower ends of said pockets and a circular zone surrounding the upper end of said liner; a slinger carried by the upper end of said sleeve and provided on its lower face with a downwardly extending circular flange; an upwardly extending circular flange formed on said bottom overlapping said downwardly extending flange; means for establishing communication between a source of fluid under pressure and the interior of said liner; and means for rotating said sleeve.

15. An extractor comprising: a frame; a sleeve rotatably mounted on said frame; an elastomer liner member bonded to and within said sleeve;

a shaft member extending through said liner member and secured and sealed to one end thereof, one of said members being formed with corrugation defining circular channels and arranged normally to form a fluid-tight seal with said other member; a perforate basket fixed to said shaft adjacent the free end of said liner and provided with a plurality of peripherally spaced balancing pockets; conduits for establishing communication between said pockets and an annular zone surrounding the free end of said liner; means for establishing communication between a source of fluid under pressure and one of said circular channels; and means for driving said shaft.

16. An extractor comprising: a cylindrical casing; a cylindrical basket resiliently mounted in said casing for limited gyratory movement with respect to its normal static axis in response to any substantial dynamic unbalance of said basket; peripherally spaced balancing pockets carried on the peripheral walls of said basket; a slinger carried by said basket for slinging balancing fluid delivered thereto to one of said balancing pockets; a normally closed balancing valve common to said pockets formed about said shaft immediately adjacent said slinger and arranged to deliver balancing fluid from its outlet end to said slinger in response to any substantial gyratory movement of said basket; and a conduit for delivering balancing fluid to the inlet end of said valve.

17. In a centrifuge, a frame, an apertured mounting member carried by said frame, a container, means supporting the container on the frame and permitting radial movement of said container relative to said mounting member, means for rotating the container, fluid balancing pockets on said container and a source of fluid for said pockets, valve means including a rubber-like sleeve element and a cooperating sealing element, said elements having normally engaged sealing surfaces that block communication between said fluid source and said pockets, the sealing surfaces of said elements having an extent in the direction of the axis of rotation, one of said sealing elements being formed so that its sealing surface is circumferentially ribbed, one of said elements mounted to move radially with said container and the other mounted to move radially with said mounting member, radial unbalance of said container during rotation thereof causing relative radial motion of said container and mounting member and separation of the normally engaged sealing surfaces of said elements, said sealing surfaces when separated defining a fluid passageway communicating with said source of fluid and at least one balancing pocket on said container.

18. In a centrifuge, a frame, an apertured mounting member carried by said frame, a container, means supporting the container on the frame, said means preventing substantially all axial motion of points on said container relative to said mounting member and permitting radial movement of said container relative to said mounting member, means for rotating the container, fluid balancing pockets on said container and a source of fluid for said pockets, valve means including a rubber-like sleeve element and a cooperating sealing element, said elements having normally engaged sealing surfaces that block communication between said fluid source and said pockets, the sealing surfaces of said elements having an extent in the direction of the axis of rotation, one of said sealing elements being formed so that its sealing surface is circumferentially ribbed, one of said elements mounted to move radially with said container and the other mounted to move radially with said mounting member, radial unbalance of said container during rotation thereof causing relative radial motion of said container and mounting member and separation of the normally engaged sealing surfaces of said elements, said sealing surfaces when separated defining a fluid passageway communicating with said source of fluid and at least one balancing pocket on said container.

19. In a centrifuge, a frame, an apertured mounting member carried by said frame, a container, shaft means mounted in said frame and connected to rotate the container, said shaft means extending through said mounting member, fluid balancing pockets on said container and a source of fluid for said pockets, valve means including a rubber-like sleeve element mounted between said mounting member and said shaft means, a sealing element having a circumferentially ribbed portion cooperating with said sleeve element to normally block communication between said fluid source and said pockets, the sealing surfaces of said elements having an extent in the direction of the axis of rotation, one of said elements mounted to move radially with said shaft means and the other mounted to move radially with said mounting member, radial unbalance of said container during rotation thereof causing radial motion of said shaft means relative to said mounting member to separate the normally engaged sealing surfaces of said elements, said sealing surfaces when separated defining a fluid passageway communicating with said source of fluid and at least one balancing pocket on said container.

20. In a centrifuge, a frame, an apertured mounting member carried by said frame, shaft means mounted in said frame and connected to rotate the container, said shaft means extending through said mounting member, fluid balancing pockets on said container, a source of fluid for said pockets, valve means including a rubber-like sleeve element supported by said mounting member, a circumferentially ribbed sealing element carried by said shaft means the ribbed surface thereof cooperating with said sleeve element to normally block communication between said fluid source and said pockets, the sealing surfaces of said elements having an extent in the direction of the axis of rotation, radial unbalance of said container during rotation thereof causing radial motion of said shaft means relative to said mounting member and separation of the normally engaged sealing surfaces of said elements, said sealing surfaces when separated defining a fluid passageway communicating with said source of fluid and at least one balancing pocket on said container.

21. In a centrifuge, a frame, a container having fluid balancing pockets, an apertured supporting member mounted in said frame, a shaft member extending through said supporting member for rotating the container, a valve unit including a rubber-like sleeve member mounted between said supporting member and said shaft, rigid sealing means on said shaft having a sealing engagement with axially spaced portions of said rubber-like sleeve, the rubber portion nearest the container being separable from the sealing means and forming a valve therewith, means to introduce fluid between said axial spaced portions of the rubber-like sleeve, the valve portion of said rubber-like sleeve member normally blocking communication between said fluid source and the pockets, lateral unbalance of said container causing relative radial motion of said shaft bushing and supporting member and separation of the valve portion of the rubber-like sleeve member from the associated sealing means to establish communication between said source of fluid and at least one balancing pocket on said container.

22. A washing and extracting machine comprising: a rotatable container having a series of fluid balancing pockets, a fluid distributing valve arranged to distribute fluid to certain of said pockets when unbalance is present, a prime mover, drive means between said prime mover and container to move said container for washing, mechanism associated with said prime mover and container to establish a spin drive for drying, clutch means associated with said mechanism for causing the spin drive to be operative to spin the container, said clutch means being biased to cause said spin drive to be inoperative, fluid operator means associated with said clutch means for overcoming said bias and initiating said spin drive, a source of fluid under pressure, a control valve controlling said source, conduit means leading from said control valve to said fluid operator means and to said distributing valve, whereby opening said control valve when pressure is available at said source overcomes the bias for said clutch means, initiates spinning of the container and supplies fluid to said valve for balancing, failure of the pressure source to supply fluid above a predetermined pressure for balancing permitting said biased clutch means to render said spin drive inoperative to spin the container.

23. A washing and extracting machine comprising: a rotatable container having a series of fluid balancing pockets, a fluid distributing valve arranged to distribute fluid to certain of said pockets when unbalance is present, a prime mover, drive means between said prime mover and container to impart a washing motion to said container, mechanism associated with said prime mover and container to render said drive means ineffectual to impart a washing motion to the container and to establish a spin drive for drying, clutch means associated with said mechanism for rendering the washing motion mechanism ineffectual and causing the spin drive to be operative, said clutch means being biased to make the washing motion mechanism operative and the spin drive inoperative, fluid operator means associated with said clutch means for overcoming said bias to initiate said spin drive, a source of fluid under pressure, a control valve controlling said source, conduit means leading from said source to said fluid operator means and to said distributing valve, whereby opening said control valve when pressure is available at said source initiates spinning of the container and supplies fluid to said valve for balancing, failure of the pressure source to supply fluid above a predetermined pressure for balancing permitting said biased clutch means to restore the washing motion of the container and render said spin drive inoperative.

24. In a washing and extracting machine: a rotatable perforated tub having a plurality of water balancing pockets, means to spin said tub for drying, a hydraulic operator for said spin means arranged to initiate spinning when water pressure is applied to the hydraulic operator, a valve assembly for directing water into said balancing pockets, said hydraulic operator means and said valve means being connected to a common source of water under pressure, and a cut-off valve in said pressure source whereby opening said cut-off valve initiates spinning of the tub and supplies water to said valve assembly for balancing the tub.

25. A dynamically self-balancing unit comprising: a frame, a rotary shaft member mounted on said frame for balanced rotation about a fixed axis but free for restricted radial displacement with respect thereto; a basket fixed to said shaft member for rotation therewith and provided with fluid receptacles disposed in spaced relation about its axis; a sleeve mounted on said frame over said shaft member and adjacent said basket for rotation on said fixed axis, the inner diameter of said sleeve being substantially greater than the outer diameter of said shaft member; an elastomer liner member disposed within said sleeve and about said shaft member, said liner member being bonded to said sleeve and fixed and sealed to said shaft member at that end of said liner member away from said basket; circular ridges formed on one of said members and arranged for sealing engagement with the other of said members when said shaft member is rotating on said fixed axis, said ridges forming channels into which the immediately adjacent portions of said liner member can flow when such portions are under compression resulting from the lateral displacement of said shaft member due to the dynamic imbalance of said basket; conduits carried by said basket communicating at one end thereof with said fluid receptacles and terminating at their other ends in a circle surrounding said shaft member adjacent said liner member; and a source of fluid under pressure communicating with one of the channels formed by said ridges, said liner member constituting a valve member responsive to any substantial displacement of said shaft member for establishing communication selectively between said source of fluid and at least one of the receptacles on that side of said shaft member opposite the direction of its displacement.

26. A dynamically self-balancing unit comprising: a frame, a rotary shaft member mounted on said frame for balanced rotation about a fixed axis but free for restricted radial displacement with respect thereto; a basket fixed to said shaft member for rotation therewith and provided with fluid receptacles disposed in spaced relation about its axis; a sleeve mounted on said frame over said shaft member and adjacent said basket for rotation on said fixed axis, the inner diameter of said sleeve being substantially greater than the outer diameter of said shaft member; an elastomer liner member disposed within said sleeve and about said shaft member, said liner member being bonded to said sleeve and fixed and sealed to said shaft member at that end of said liner member away from said basket; circular ridges formed on said shaft member and arranged for sealing engagement with said liner member when said shaft member is rotating on said fixed axis, said ridges forming channels into which the immediately adjacent portions of said liner member can flow when such portions are under compression resulting from the lateral displacement of said shaft member due to the dynamic imbalance of said basket; conduits carried by said basket communicating at one end thereof with said fluid receptacles and terminating at their other ends in a circle surrounding said shaft member adjacent said liner member; and a source of fluid under pressure communicating with one of the channels formed by said ridges, said liner member constituting a valve member responsive to any substantial displacement of said shaft member for establishing communication selectively between said source of fluid and at least one of the receptacles on that side of said shaft member opposite the direction of its displacement.

GEORGE T. HEMMETER.

REFERENCES CITED

The following references are of record in the file of this patent:

UNITED STATES PATENTS

| Number | Name | Date |
|---|---|---|
| 305,026 | Stillman | 1884 |
| 608,788 | McAllister | Aug. 9, 1898 |
| 1,521,858 | Bock | Jan. 6, 1925 |
| 1,604,748 | Grauer | Oct. 26, 1926 |
| 2,093,281 | Kreuser | Sept. 14, 1927 |
| 2,144,064 | Johnson | Jan. 17, 1939 |
| 2,159,137 | Doty | May 23, 1939 |
| 2,244,241 | Verdier et al. | Dec. 10, 1940 |
| 2,230,345 | Bradbury | Feb. 4, 1941 |
| 2,269,190 | Dunham | Jan. 6, 1942 |
| 2,346,158 | Dyer | Apr. 11, 1944 |
| 2,360,379 | Vetorino | Oct. 17, 1944 |
| 2,375,635 | Dyer | May 8, 1945 |

FOREIGN PATENTS

| Number | Country | Date |
|---|---|---|
| 51,902 | Germany | July 12, 1889 |